(12) United States Patent
Baker (10) Patent No.: US 10,602,395 B2
(45) Date of Patent: Mar. 24, 2020

(54) SYSTEM AND METHODS FOR MONITORING AVIATION RF ENVIRONMENTS

(71) Applicant: The MITRE Corporation, McLean, VA (US)

(72) Inventor: Amy L. Baker, Westford, MA (US)

(73) Assignee: THE MITRE Corporation, McLean, VA (US)

( * ) Notice: Subject to any disclaimer, the term of this patent is extended or adjusted under 35 U.S.C. 154(b) by 0 days.

(21) Appl. No.: 15/981,348

(22) Filed: May 16, 2018

(65) Prior Publication Data

US 2019/0357077 A1   Nov. 21, 2019

(51) Int. Cl.
| | |
|---|---|
| *H04W 28/02* | (2009.01) |
| *G08G 5/00* | (2006.01) |
| *G08G 5/04* | (2006.01) |
| *G01S 13/91* | (2006.01) |
| *G01S 13/933* | (2020.01) |

(52) U.S. Cl.
CPC ...... *H04W 28/0284* (2013.01); *G08G 5/0008* (2013.01); *G08G 5/0078* (2013.01); *G01S 13/91* (2013.01); *G01S 13/933* (2020.01); *G08G 5/045* (2013.01)

(58) Field of Classification Search
CPC ............ H04W 28/0284; G08G 5/0008; G08G 5/0078
See application file for complete search history.

(56) References Cited

U.S. PATENT DOCUMENTS

| | | | | |
|---|---|---|---|---|
| 4,782,450 A | * | 11/1988 | Flax | ............ G01S 5/12 342/32 |
| 9,658,325 B2 | | 5/2017 | Harvey et al. | |
| 2015/0331099 A1 | * | 11/2015 | Wu | ............ G01S 13/876 342/32 |
| 2016/0101855 A1 | | 4/2016 | Stefani | |
| 2016/0301130 A1 | | 10/2016 | Nazario-Romero | |

FOREIGN PATENT DOCUMENTS

CN   103701488   4/2014

OTHER PUBLICATIONS

Panken, A.D. et al. (2012) "Measurements of the 1030 and 1090 MHz Environments at JFK International Airport," Project Report ATC-390, Lincoln Laboratory Massachusetts Institute of Technology; 123 pages.

* cited by examiner

*Primary Examiner* — Mohammad S Anwar
(74) *Attorney, Agent, or Firm* — Morrison & Foerster LLP (57) ABSTRACT

An RF congestion monitoring system and method is provided. In one or more examples, the RF congestion monitoring system can include a modified aircraft transponder capable of receiving signals associated with Air Traffic Control and Traffic Collision Avoidance Systems, analyzing the received signals to determine the presence on one or more events occurring in the received signals, and generating an event count that identifies the types of signals associated with the events being received. A processor can receive the generated event count and based on the received count can calculate a transponder occupancy percentage metric indicative of the amount of RF congestion in a given air space. In one or more examples, the modified transponder can be configured to receive various radar signals in the 1030 and 1090 MHz frequency signal bands and process those signals to determine the amount of RF congestion in the airspace.

30 Claims, 7 Drawing Sheets

SYSTEM AND METHODS FOR MONITORING AVIATION RF ENVIRONMENTS

STATEMENT REGARDING FEDERALLY SPONSORED RESEARCH OR DEVELOPMENT

This invention was made with Government support under U.S. Government contract W56KGU-16-C-0010/D330, awarded by the Deputy Assistant Secretary of Defense (DASD) Command, Control, Communications, Cyber, & Business Systems—USD AT&L. The Government has certain rights in this invention.

FIELD OF THE DISCLOSURE

This disclosure relates to systems and methods for monitoring aviation radio frequency environments and specifically for monitoring signal traffic in aviation cooperative surveillance environments. The systems and methods described herein can be used to quantify signal traffic in particular radio frequency (RF) bands, specifically those used by both civil and military aviation aircraft for cooperative surveillance, so as to assess the amount of RF traffic that exists in a given airspace.

BACKGROUND OF THE DISCLOSURE

To ensure the safety of aircraft flying in any given airspace, each aircraft must have sufficient access to necessary RF spectrum so that it can communicate vital information back and forth between itself, other aircraft, and air traffic control. As an example, aircraft make particular use of 1030/1090 MHz frequency bands to transmit and receive information to and from other aircraft and Air Traffic Control. The 1030/1090 MHz spectrum is used extensively by the civil aviation community for collision avoidance systems and Air Traffic Control (ATC) and in the military context for Identification Friend or Foe (IFF) systems. Due to the increasing demand for spectrum coupled with increases in air traffic, there is a significant risk that an aircraft that is transmitting or receiving vital information may not have the necessary access to the RF spectrum to communicate with other aircraft or Air Traffic Control. Congestion in the RF spectrum can lead to the need for restrictions that limit the amount of interrogators or air traffic in a given airspace.

A system and method for detecting and quantifying signal congestion in an RF spectrum of a given airspace can be valuable to characterize the current congestion levels in a given spectrum. The systems and methods can also be used to predict the impacts on a given RF spectrum from changes to the types of signals and traffic being transmitted from aircraft and Air Traffic Control.

SUMMARY OF THE DISCLOSURE

Accordingly, one or more systems and methods for detecting and monitoring RF signal activity in a given airspace is provided. In one or more examples, the system can include an antenna configured to receive a particular frequency or frequency range within the RF spectrum, an event monitor configured to receive signals from the antenna and output information that can be used to characterize an airspace's RF signal congestion.

In one or more examples, an event monitor can be configured to receive a signal from an RF antenna and output information about the received RF signals, such as an interrogation count, suppression count, the number of Traffic Collision Avoidance System (TCAS) equipped aircraft, and transponder reply count. In one or more examples, the event monitor can also be configured to receive a signal from an RF antenna and output information about the RF of other aircraft replies to interrogations or aircraft squitters (False Replies Unsynchronized in Time (FRUIT)). A squitter is a message that is transmitted from the aircraft without the aircraft being interrogated.

In one or more examples, the information generated by the event monitor can be processed in real-time to provide the user of the system and method a visualization of the RF traffic congestion that can be displayed. The information generated by the event monitor can also, in one or more examples, be used to calculate a transponder occupancy calculation that characterizes the percentage of time that a given transponder in the airspace is occupied by RF events occurring in the airspace.

The systems and methods described above can be used to analyze a given airspace to determine the extent to which the RF traffic in the airspace is over-utilized thereby leading to conditions in which transmissions between aircraft and/or Air Traffic Control may be missed due to the activity of competing RF signals.

DETAILED DESCRIPTION

In the following description of the disclosure and embodiments, reference is made to the accompanying drawings in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Described herein are systems and methods for detecting and monitoring RF signal activity in a given airspace and providing a user interface through which the system communicates the results to a user of the system. In one example, the RF signal monitor can include one or more antennas that are specifically configured to receive a particular band within the RF frequency spectrum, an event monitor that can process the data and extract information that is related to the RF signals being transmitted in the airspace, and a processor that can take the extracted data from the event monitor to generate a characterization of the RF signal congestion computationally and visually.

Figure 1:
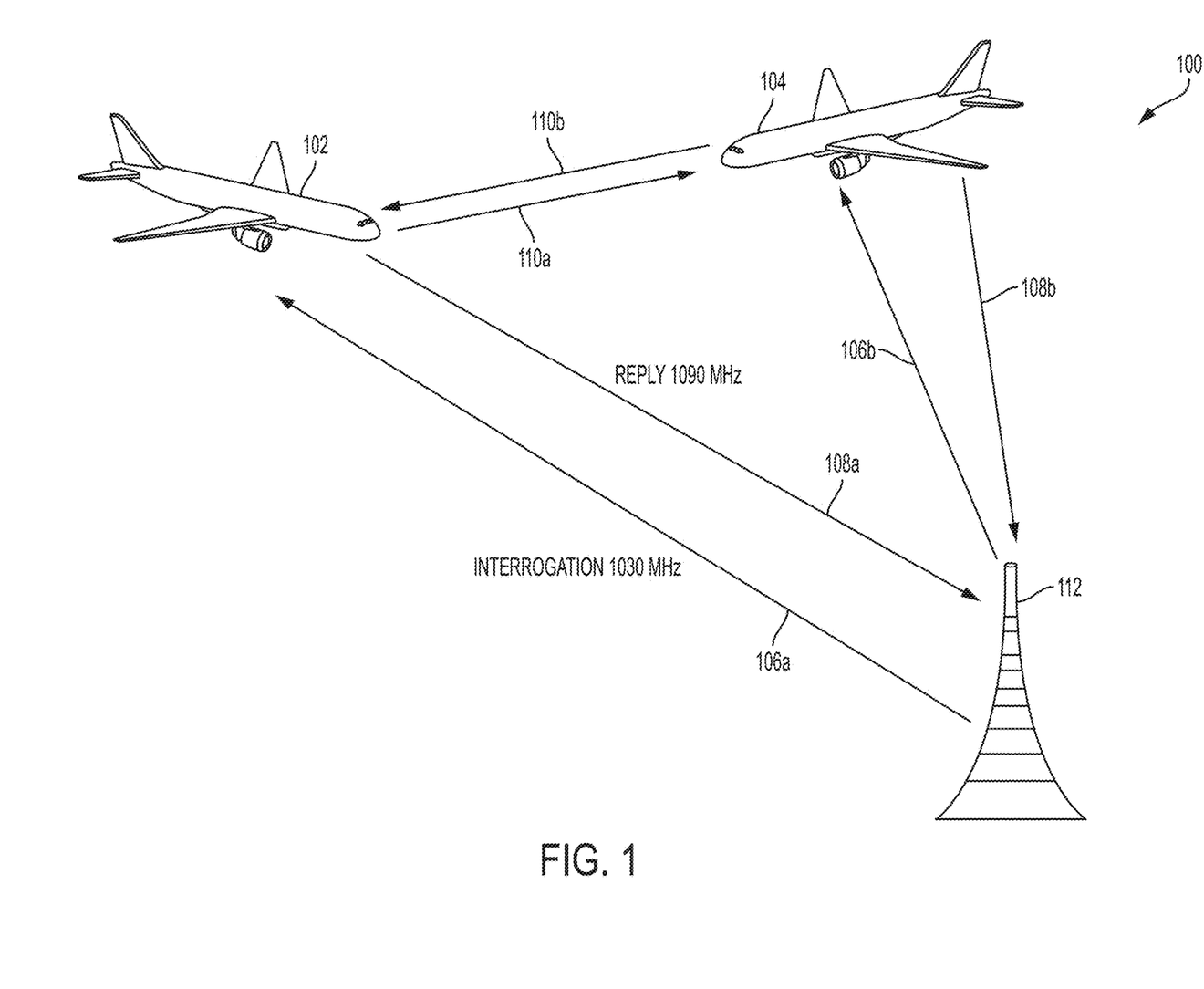
FIG. 1 illustrates example RF communications occurring in a given airspace according to examples of the disclosure.

FIG. 1 illustrates example RF communications occurring in a given airspace according to the examples of the disclosure. In the example of FIG. 1, airspace 100 can include aircraft 102 and 104 and ground station 112. Aircraft 102, 104, and ground station 112 can be configured to transmit and receive RF signals. For example, ground station 112 can be associated with Air Traffic Control and can be configured to send and receive RF signals such that Air Traffic Controllers on the ground can send and receive information to and from aircraft that are within the airspace.

Each of aircraft 102 and 104 can be configured to send and receive RF signals (using one or more antenna located on the aircraft and not picture). As illustrated in the figure, aircraft 102 and 104 can send and receive signals to each other, thereby communicating with each other, and can also send and receive signals to and from ground station 112, thereby communicating with Air Traffic Controllers.

In one or more examples, the signals that are sent back and forth between aircraft, and between the aircraft and Air Traffic Controllers, can be part of a secondary surveillance radar (SSR) system. SSR can be utilized by Air Traffic Controllers and aircraft to detect and measure the position of aircraft and can also be used to communicate additional information pertaining to an aircraft's identity.

In one or more examples of an implementation of an SSR system, ground station 112 can act as an SSR ground station that can transmit interrogation pulses to individual aircraft and receive replies from the interrogated aircraft with the requested information. In one or more examples, in the context of an SSR system operation, the ground station 112 can transmit an interrogation pulse 106a to aircraft 102 and a separate interrogation pulse 106b to aircraft 104. Both interrogation pulses 106a and 106b can be transmitted at a frequency of 1030 MHz within the RF spectrum per conventional SSR implementations.

Once an aircraft (either 102 or 104 or both) receive an interrogation signal, the aircraft can transmit a reply to ground station 112 using a separate antenna and RF spectrum band. In the example of SSR, an aircraft can send a reply that is transmitted at a frequency of 1090 MHz within the RF Spectrum per conventional SSR implementations. In the example of FIG. 1, aircraft 102 and 104 can send replies 108a and 108b on the 1090 MHz band to ground station 112 (i.e., Air Traffic Control).

In one or more examples, the SSR system described above can be augmented or be replaced by an Automatic Dependent Surveillance—Broadcast (ADS-B) system. In ADS-B systems, an aircraft can determine its position by using a global positioning system (GPS) or other satellite means. The aircraft can then transmit that information periodically to an ADS-B receiving station, thereby enabling the aircraft to be tracked from the ground, or by other aircraft. In this way, the aircraft, rather than having to wait for an interrogation signal from the ground, can continuously relay (squitters) its flight information to Air Traffic Controllers.

In one or more examples, the aircraft 102 and 104 described above can implement a Traffic Collision Avoidance System (TCAS). TCAS can be configured to reduce the probability of mid-air collisions of aircraft. Rather than rely on ground stations, TCAS can involve aircraft-to-aircraft communications. Using the example of FIG. 1 to exemplify the concept of TCAS, aircraft 102 and 104 can send and receive signals 110a and 110b to one another. Signals 110a and 110b can include interrogation signals (as described above) on the 1030 MHz band and replies on the 1090 MHz band.

In the example of FIG. 1, with only two aircraft (102 and 104) and a ground station 112, and as described above, there are numerous signals being transmitted and received within the airspace. If enough aircraft occupy the airspace, or if enough signals are being transmitted and received at a given time within the airspace, the airspace could be characterized as being congested from an RF spectral point of view. The RF spectrum of a given airspace can be considered congested when there is a substantial probability that a transmitted message will not be received by its intended recipient due to other signals in the airspace interfering with that signal.

Figure 2:
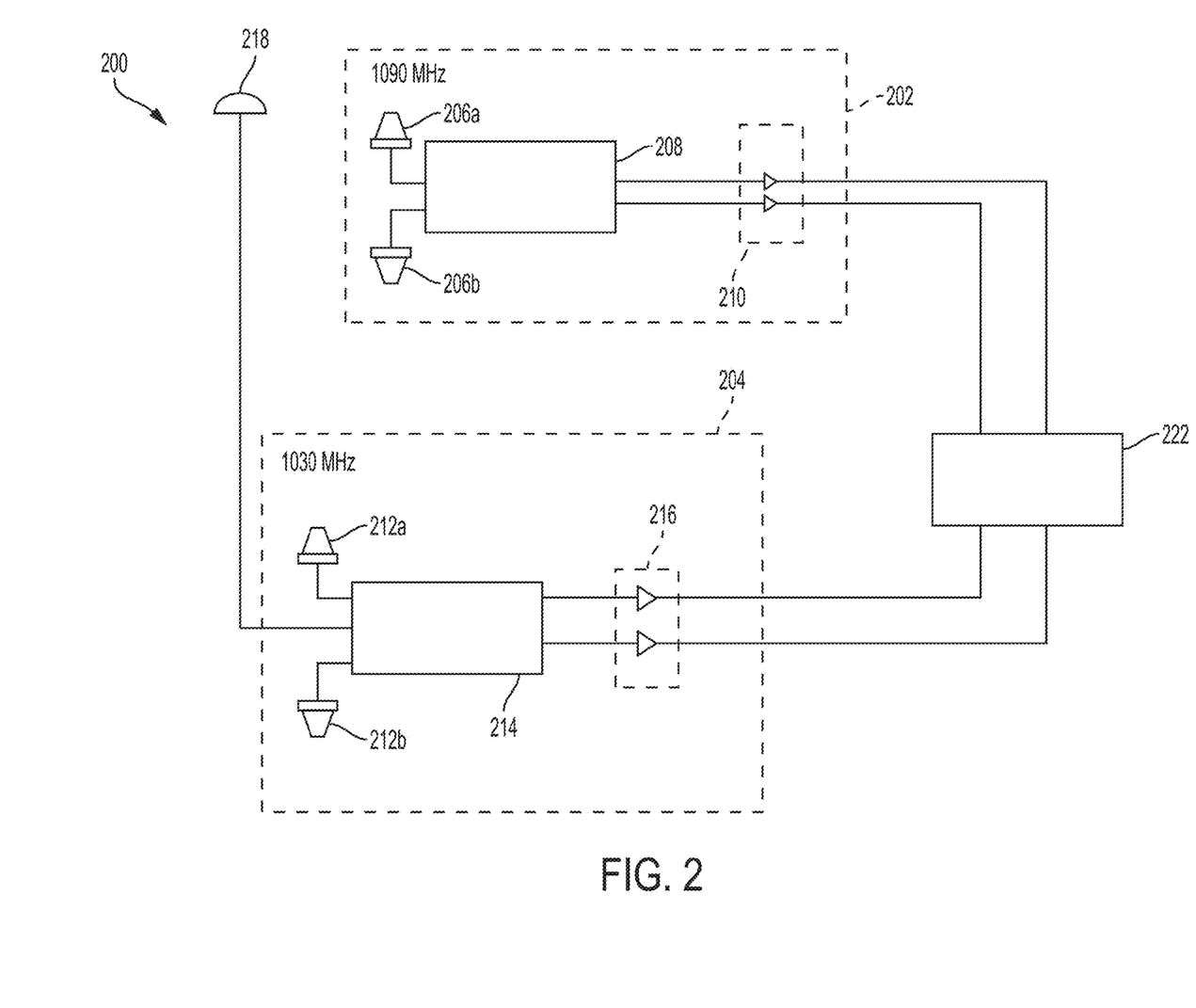
FIG. 2 illustrates an RF Signal Activity Monitor according to examples of the disclosure.

Determining whether a given airspace is congested can require specially configured tools that can monitor the RF spectrum of a given airspace and, based on received data, can calculate objective metrics that can allow for the user of the tools to determine the level of congestion within the airspace. FIG. 2 illustrates an RF Signal Activity Monitor according to examples of the disclosure. The system 200 illustrated in FIG. 2 can represent a conventional approach to RF signal monitoring that when implemented can allow for a user of the system to record RF signals in a given airspace over a given time period, and then post-process the received data to quantify the amount of congestion in the given airspace. The system 200 can be implemented in an aircraft that is specifically flown into a given airspace for the purpose of collecting data by which to characterize the RF congestion of a particular airspace.

The system 200 can be configured to receive both signal traffic at the 1090 MHz signal band (i.e., replies from aircraft to interrogations as described above) and signal traffic at the 1030 MHz signal band (i.e., interrogation signals as described above). In the example of FIG. 2, the system 200 can include a 1090 MHz receiver 202, and a 1030 MHz receiver 204. Each of receiver 202 and 204 can be configured to receive signals in their respective bands, and as described below, the received data can be post-processed so as to characterize the RF congestion of a particular airspace during a particular period of time.

In the example of FIG. 2, the 1090 MHz receiver 202 can include two antennas 206a and 206b. Antenna 206a and 206b can, in one or more examples, be implemented as L-Band antennas. Antenna 206a can be mounted to the top of an aircraft while antenna 206b can be mounted to the bottom of this aircraft. In this way, the system 200 can receive substantially all of the "line of sight" traffic directed in the direction of the aircraft in which the system is operating. In the example of the 1090 MHz receiver, the "line of sight" traffic can include replies to interrogations that are being transmitted by various aircraft within the airspace as described above.

The 1090 MHz receiver 202 of system 200 can also include an RF receiver 208. RF receiver 208 can include the "RF front end" circuitry that can process the signal received on the antennas at the original incoming radio frequency and can include RF filters, and low noise RF amplifiers, as examples. The overall goal of the RF receiver 208 can be to isolate and clean up (i.e., from interference) signals that appear in the 1090 MHz band. In this way, the RF receiver 208 can prepare the received signals so that they can be recorded and analyzed all the while minimizing the likelihood that the analysis is flawed due to signal distortions. The 1090 MHz receiver 202 of system 200, in one or more examples, can also include a backend amplifier 210 that can provide a final amplification of the signal before it is recorded and logged into a memory for storage (described below).

In the example of FIG. 2, the 1030 MHz receiver 204 can include two antennas 212a and 212b. Antenna 212a and 212b can, in one or more examples, be implemented as L-Band antennas. Antenna 212a can be mounted to the top of an aircraft while antenna 212b can be mounted to the bottom of this aircraft. In this way the system 200 can receive substantially all of the "line of sight" traffic directed in the direction of the aircraft in which the system is operating. In the example of the 1030 MHz receiver, the "line of sight" traffic can include interrogation signals that are being transmitted by various aircraft and Air Traffic Control within the airspace as described above.

The 1030 MHz receiver 204 of system 200 can also include an RF receiver 214. RF receiver 214 can include the "RF front end" circuitry that can process the signal received on the antennas at the original incoming radio frequency and can include RF filters, and low noise RF amplifiers, as examples. The overall goal of the RF receiver 214 can be to isolate and clean up (i.e., from interference) signals that appear in the 1030 MHz band. In this way, the RF receiver 214 can prepare the received signals so that they can be recorded and analyzed all the while minimizing the likelihood that the analysis is flawed due to signal distortions. The 1030 MHz receiver 204 of system 200, in one or more examples, can also include a backend amplifier 216 that can provide a final amplification of the signal before it is recorded and logged into a memory for storage (described below).

In the example of FIG. 2, receiver 204 of system 200 can also be configured to receive one or more GPS signals from a GPS antenna 218. The GPS antenna can receive signals from satellites associated with a global positioning system that can provide accurate location data about the aircraft in which the system 200 is operating at any given time.

System 200 can also include a data acquisition system 222 that is configured to receive signals received from receivers 202 and 204 and store them in a memory. In the example of FIG. 2, data acquisition system 222 can receive signals from the 1090 MHz receiver 202 and from the 1030 MHz receiver 204 (which can include GPS signals acquired from GPS antenna 218) and store those signals for later processing. In one or more examples, the data acquisition system 222 can convert the analog signals to digital signals using a 10 MHz sampling rate, thereby enabling the analog signals received at the antennas to be stored for later processing.

While the above system can allow for the analysis of the RF traffic within a particular airspace, that analysis is not performed in real-time, but instead may require that the data collected in data acquisition system 222 be processed in a lab to determine what the congestion of the environment was at the time that the data in the data acquisition was collected. Furthermore, the system described in the example of FIG. 2 may have a large size footprint, often requiring multiple "racks" to house all of the equipment associated with the system 200.

In light of the above limitations associated with the RF monitor described with respect to FIG. 2, a system that can offer a smaller footprint while at the same time allowing for the real-time monitoring of RF congestion within an given airspace can be highly desirable. One reason that the RF monitor depicted in FIG. 2 can have a large footprint and be costly to operate is because the RF monitor is recording the signal in its entirety. However, for the purposes of monitoring congestion within a given airspace, the entire RF signal may not need to be collected and stored. Rather, the fact that an interrogation has occurred and been received by the transponder may be the only information that is required to predict the congestion within a given airspace. Thus, rather than having to store an entire RF signal, which can require an analog-to-digital converter as well as memory, a transponder that is equipped to receive interrogations and transmit replies can be modified to simply count the number of interrogations received and other data that may be needed to conduct an RF congestion analysis in a given airspace. In this way, the footprint of the RF monitor may be reduced by virtue of not requiring certain hardware components associated with the process of recording and storing RF signals.

Furthermore, by counting events (described below) rather than recording RF signals wholesale, in addition to having a smaller footprint, the system can provide real-time information about the congestion within a given airspace. In contrast to the example described above with respect to FIG. 2, rather than require post-processing, because the analysis may no longer require the wholesale recording and storing of RF signals, the congestion of an RF environment can be monitored in real-time.

Figure 3:
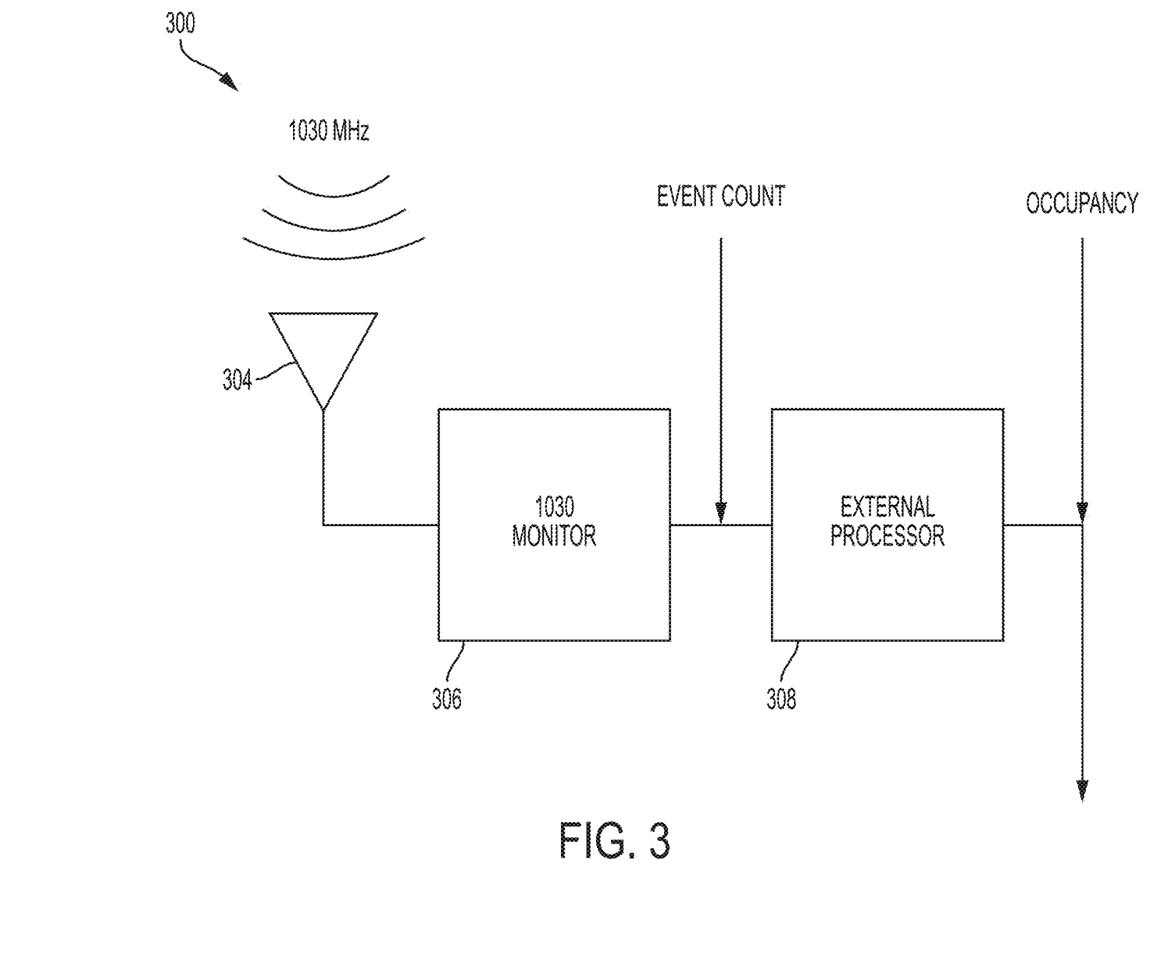
FIG. 3 illustrates an exemplary 1030 MHz RF Signal Activity Monitor according to examples of the disclosure.

FIG. 3 illustrates an exemplary 1030 MHz RF Signal Activity Monitor according to examples of the disclosure. In the example of FIG. 3, a system 300 can include an antenna 304, and a monitor 306, and a processor 308. As described, each component below can be utilized to provide an estimate of the occupancy rate that a transponder operating in the particular airspace being measured is experiencing.

System 300 can include an antenna 304 that can be configured in substantially the same way as antenna 212a and 212b to receive signals in the 1030 MHz band. The system 300 can also include a 1030 MHz monitor 306 that is configured to generate an event count based on the signals received by the antenna 304. A 1030 MHz receiver may need to be in conformance with a Minimum Operation Performance Standard (MOPS) enforced by the Federal Aviation Administration that can require that the 1030 MHz be configured to receive an interrogation signal, interpret the received signal, format a message in response to the interrogation signal, and send the formatted message back to the ground. However, for the purposes of monitoring RF congestion in the RF airspace, all of the functionality imposed by the MOPS may not be required.

Monitor 306 can be configured to only receive the interrogations signals and log that the signals were received rather than having to go through the process of generating a reply. In other words, the system used to monitor RF congestion can be a "receive-only" system insofar as it may not need to actually transmit any signals to achieve its objective of characterizing RF congestion. The 1030 MHz monitor 306 can simply count the number of interrogations it receives, as well as other signals that would normally cause the transponder on an aircraft to respond. For instance, in one or more examples, monitor 306 can also count the number of Traffic Collision Avoidance System (TCAS) aircraft it encounters. In other words, the monitor 306 can count the number of individual TCAS requests it receives. In one or more examples, the monitor 306 can count the number of suppression requests that it receives. A suppression request can include signals from an SSR or other external entities to an aircraft requesting that the aircraft suppress any transmissions for a pre-determined amount of time.

Also, in one more examples, the monitor 306 can also count the number of replies it would have generated in response to the interrogations it received. As discussed above, since the 1030 MHz monitor can be a receive-only system, rather than transmit replies in response to the interrogations it receives, the monitor 306 can simply keep a count of the number of replies it would have sent as a result of the interrogations it received. As discussed in detail below, this information can be used in characterizing the level of RF congestion in the airspace.

The output of monitor 306 can be a signal that indicates the type event (i.e., interrogation, reply, etc.) that is occurring at any given moment in time at antenna 304. That information can be generated by monitor 306, and passed to processor 308, wherein an occupancy metric can be calculated, a visualization of the RF congestion can be provided in real-time, and wherein data generated can be stored in memory and tagged with time and location information, in one or more examples of the disclosure.

In one or more examples, RF congestion can be characterized using transponder occupancy as a metric that is representative and proportional to the RF congestion being experienced in a given airspace. Transponder occupancy, in one or more examples, is defined as the time a transponder detects an incoming signal that causes some action to the time that it is capable of replying to another interrogation. In other words, transponder occupancy is a measure of the amount of time that a transponder is "unavailable" to process any RF signals it receives. For instance, when an RF transponder receives an interrogation signal, during the period of time when the transponder is processing the signal, preparing a reply to the received interrogation signal, and transmitting the reply, the transponder may be unable to receive or process any other signals. Thus, any signals sent to the transponder during this "busy" period may be "missed" by the transponder. In a dense/congested RF environment, any given transponder operating in the environment might be occupied for an excessive amount of time due to the multitude of RF signals being received by the transponder. Thus, transponder occupancy can be a suitable metric for characterizing the level of RF congestion within a given airspace.

Transponder occupancy can be calculated at processor 308 based on the events being registered at monitor 306. As an example, the type of reply generated by the monitor 306 can determine how long a transponder is unavailable (i.e., occupied). Each type of reply can have an associated amount of time of transponder occupancy associated with it. The amount of time that the transponder is occupied due to a reply can be a function of the length of the reply. For instance, a Mode A reply may be a shorter reply than a Mode S reply.

The amount of time that each type of reply will occupy a transponder can be determined empirically. Longer replies can occupy a transponder for longer periods of time, while shorter replies will occupy a transponder for shorter periods of time. Thus, not only do the number of RF events occurring in an airspace lead to increased transponder occupancy, but the types of replies that the RF events engender can also lead to increased transponder occupancy. Furthermore, different aircraft transponders can be manufactured in various ways using different hardware that may change the occupancy seen by various transponder implementations. The table provided below provides an example of the various occupancy times for various events recorded by an exemplary transponder. As the table below illustrates, the various replies that can be recorded by the monitor 306 can lead to varying periods of occupancy for the transponder depending on what type of reply is being generated.

| Event | Example Time Occupied |
| --- | --- |
| Mode A Reply | 48.5 μs |
| Mode C Reply | 61.5 μs |
| Mode S/A Reply | 218.5 μs |
| Mode S/C Reply | 231.5 μs |
| Mode S Short Reply | 213.3 μs |
| Mode S Long Reply | 269.3 μs |
| Suppression | 35.5 μs |

Having empirically determined the transponder occupancy of various RF events that can occur during the operation of a transponder in-flight beforehand can allow for comparison of transponder occupancy that is calculated and visualized in real-time. For instance, occupancy percentage can be calculated using the empirically determined occupancy time periods described above. Occupancy percentage can refer to the percentage of time that a transponder is occupied during a given time period. If a transponder is 100% occupied, that means during the time period, the transponder was never available to field interrogations. Likewise, if a transponder is 0% occupied during a time period, that can mean that the transponder was available at every moment during the given time period. Thus, occupancy percentage can be a good metric for ascertaining the level of RF congestion in a given airspace. In a crowded and congested airspace, one would expect the occupancy percentage will be higher because the transponder is receiving more messages. In a low congestion environment, one would expect that occupancy percentage would be lower because the transponder is not receiving as many signals. In one or more examples of the disclosure, occupancy percentage can be calculated using the following formula:

$$P_{Occ} = \frac{\sum_{E} T_E N_E}{X} * 100$$

In the above formula, $P_{Occ}$ can represent percentage of time that a transponder is occupied. $T_E$ can represent the time period of occupancy for a given event E, which is empirically determined as described above. $N_E$ can represent the number of events E that occurred within a given time period. Finally, X can represent the time period of measurement. To illustrate the above formula using an example, suppose that during a one second period of time, there were 10 Mode A replies, 10 Mode C replies, and 50 Suppression requests received at monitor 306. Using the table and formula above, the percentage occupancy above can be calculated as:

$$P_{Occ} = \frac{10*48.5 \ \mu s + 10*61.5 \ \mu s + 50*35.5 \ \mu s}{1 \ second} * 100 = 0.29\%$$

Thus, the above calculation reveals that over a one second period of time, the transponder was occupied (i.e., not able to field new interrogations) for 0.29% of the time, i.e., 0.0029 seconds. Using the above example, if the airspace were to see an increase in RF traffic, then the number of events that occurred over a one second period may increase, thereby leading to a higher occupancy percentage.

Figure 4:
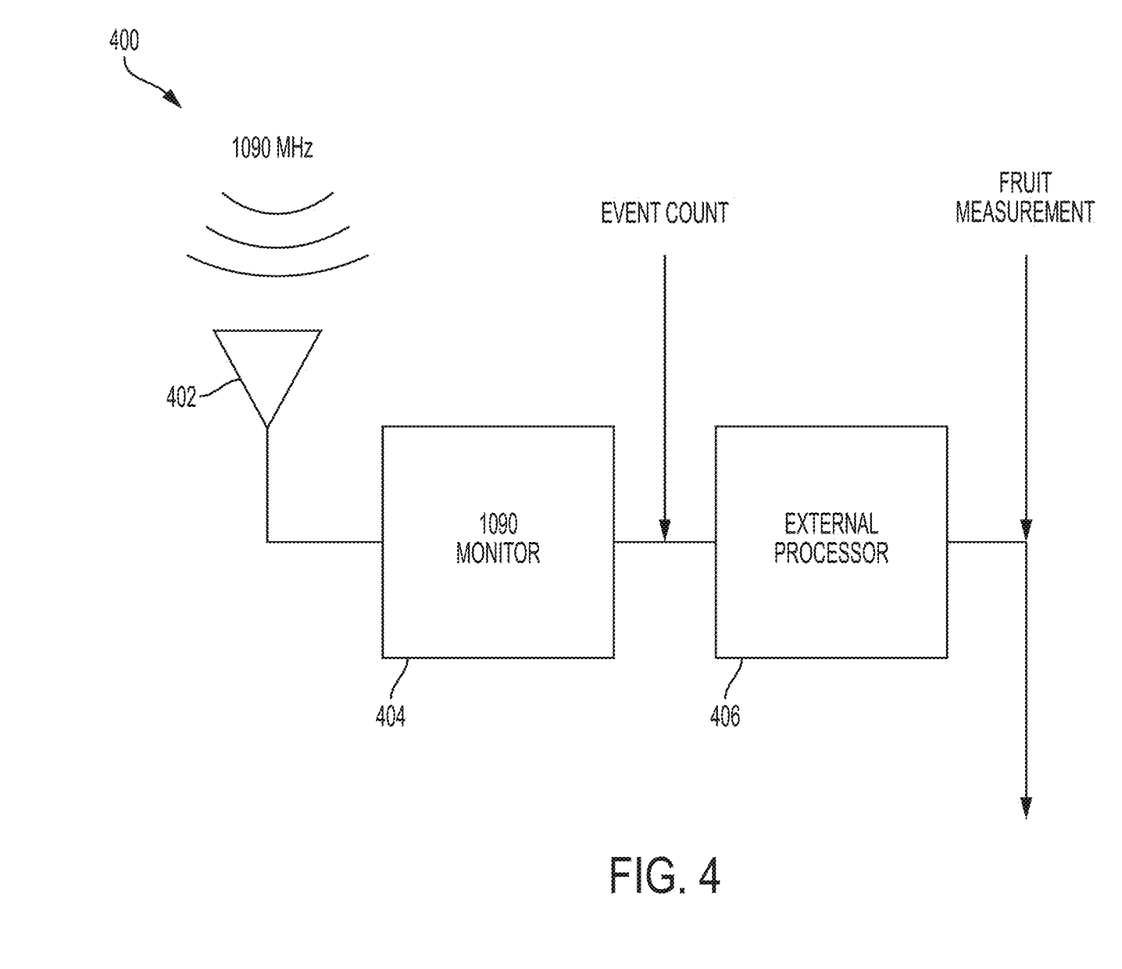
FIG. 4 illustrates an exemplary 1090 MHz RF Signal Activity Monitor according to examples of the disclosure.

As discussed above, monitoring an RF airspace for congestion can include monitoring signals in not only the 1030 MHz signal band (i.e., interrogation signals), but can also include monitoring signals in the 1090 MHz signal band (i.e., replies). FIG. 4 illustrates an exemplary 1090 MHz RF Signal Activity Monitor according to examples of the disclosure. In the example of FIG. 4, system 400 can include similar components to the example of FIG. 3. In one or more examples, system 400 can include an antenna 402 that can be configured to receive signals in the 1090 MHz band.

The system 400 can also include monitor 404 that can be configured to record "events" (described in detail below) that occur on the 1090 MHz antenna 402. In one or more examples, the 1090 MHz monitor 404 can be configured as a modified "Automatic Dependent Surveillance—Broadcast" (ADS-B) receiver. ADS-B technology allows an aircraft to periodically transmit (squitter) signals that include information about the aircraft's name, speed, altitude, and other pertinent flight information without requiring a corresponding interrogation signal. Specifically, 1090 MHz monitor 404 can be configured as a modified ADS-B In receiver. ADS-B In can refer to equipment that allows an aircraft to receive and interpret other participating aircraft's data.

Similar to the monitor 306, the monitor 404 can be modified so as to only log events (i.e., count events). In one or more examples, monitor 404 can be modified to record other aircraft replies to interrogations (False Replies Unsynchronized in Time (FRUIT)). Since most aircraft reply on the same 1090 MHz frequency, many of the signals received on the 1090 MHz band are unwanted because they are intended for other ground stations that are interrogating other aircraft. Generally, FRUIT levels are proportional to the amount of noise on a given RF frequency. With respect to RF congestion, the presence of a large amount of FRUIT can indicate a higher level of RF congestion. Thus, an RF monitor configured to log FRUIT can be used to verify RF congestion levels in a given airspace. System 400 can also include a processor 406 that is configured to receive the event count from monitor 404.

Figure 5:
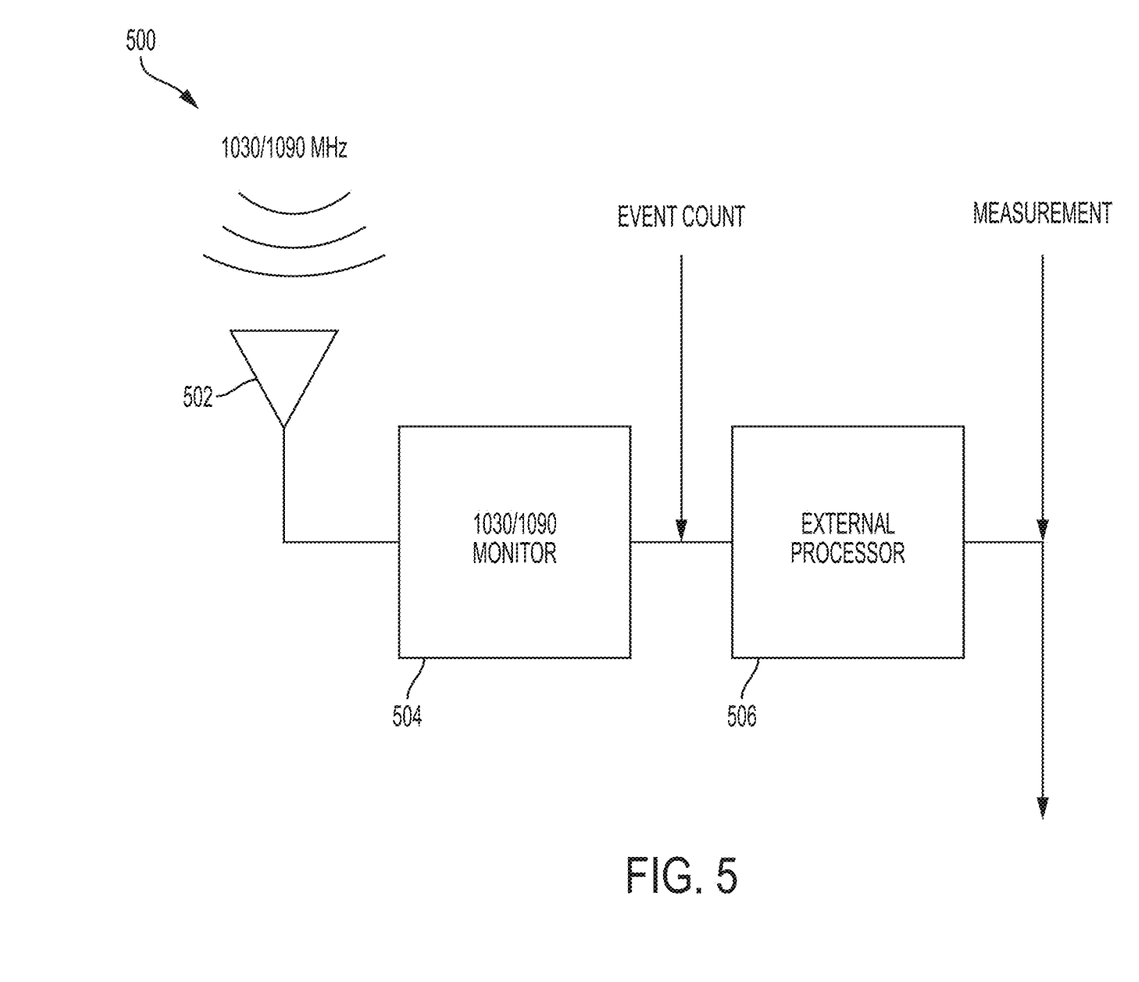
FIG. 5 illustrates an exemplary combined 1030/1090 MHz RF monitor according to examples of the disclosure.

While the examples of FIG. 3 and FIG. 4 are illustrated as separate systems, the disclosure should not be seen as limiting, and it would be apparent to one of skill in the art that the separate systems depicted in FIGS. 3 and 4 can be combined into a single system. FIG. 5 illustrates an exemplary combined 1030/1090 MHz RF monitor according to examples of the disclosure. In the example of FIG. 5, system 500 can be configured with an antenna 502 that can be configured to receive signals in both the 1030 MHz and 1090 MHz signal bands. System 500 can also include a monitor 504 that can be configured to perform the functionality described above with respect to both monitors 306 and 404. Finally, system 500 can also include an external processor that can be configured to perform the functionality described above with respect to both processors 308 and 406.

Figure 6:
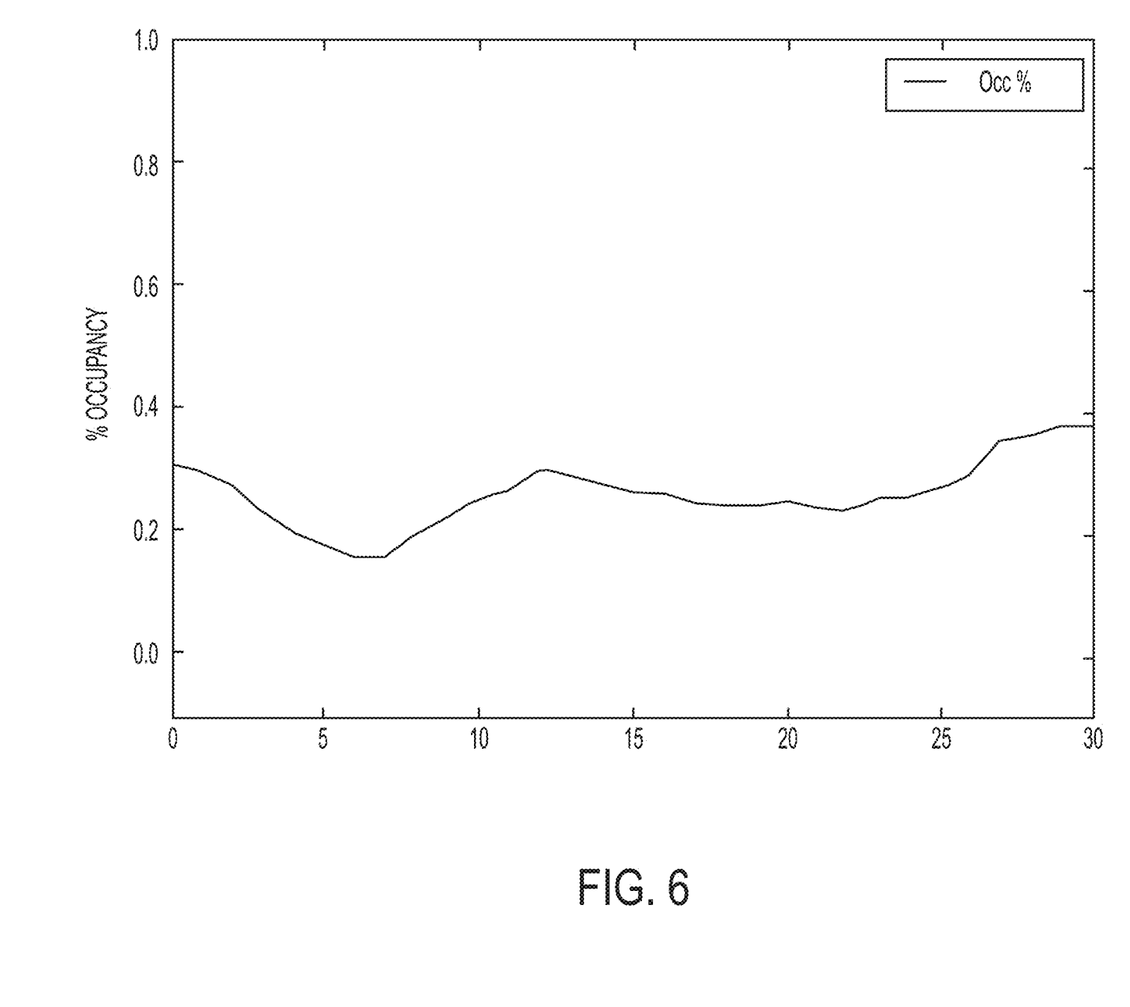
FIG. 6 illustrates an exemplary RF Signal Congestion visualization according to examples of the disclosure.

Returning to the example of FIG. 3, and as described above, processor 308 can not only calculate the occupancy percentage of a transmitter, but can also provide a visualization to a user (on a display for example) that illustrates the real-time RF congestion of the airspace. FIG. 6 illustrates an exemplary RF Signal congestion visualization according to examples of the disclosure. In the example of FIG. 6, visualization 600 can be implemented as a line graph of percent occupancy vs. time. In one or more examples, visualization 600 can be a near real-time rolling average of transponder occupancy vs. time, wherein the rolling average can be configured by the user adjusting one or more parameters associated with the calculation of a rolling average. For example, and as shown in visualization 600, the user can adjust the window size, occupancy step size, resolution, and update rate to generate the line graph that represents a rolling average of the occupancy percentage at any given time. Additionally, in one or more examples, visualization 600 can also provide a play back of previously recorded data to get a visual representation of occupancy over time.

Also as discussed above with respect to FIG. 3, processor 308 can also be configured to store the event data in memory and tagged with time and location information, in one or more examples of the disclosure. The time and location information can come from an external GPS antenna (not pictured) that can be utilized to time and location stamp the event data when it is being stored.

Figure 7:
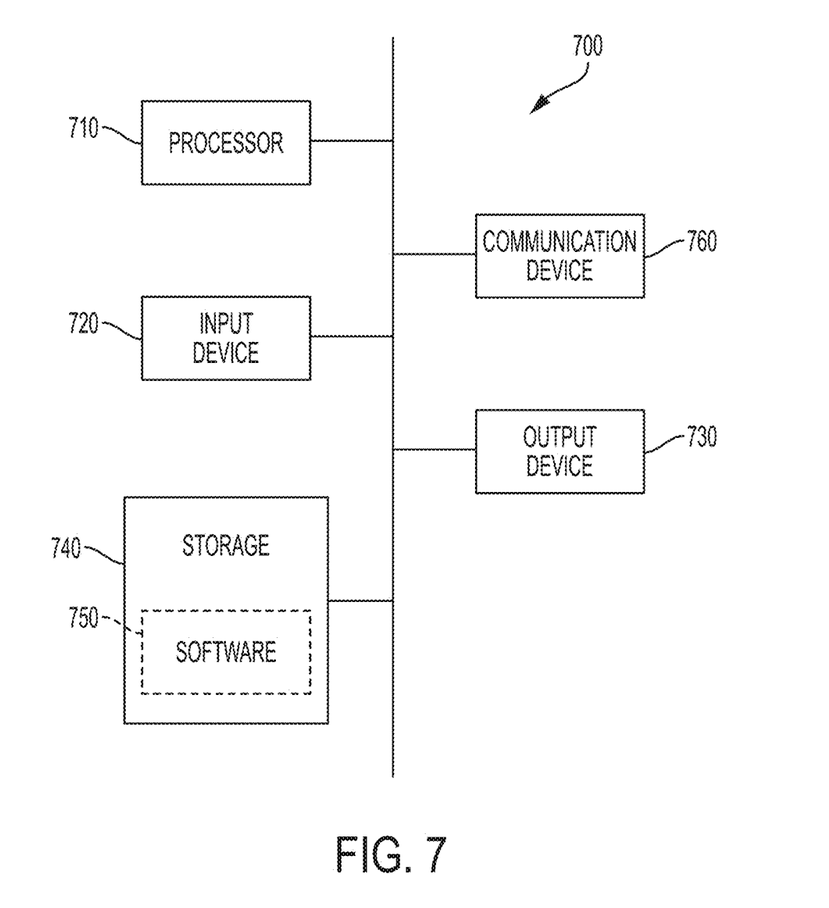
FIG. 7 illustrates an exemplary computing device according to examples of the disclosure.

FIG. 7 illustrates an example of a computing device in accordance with one embodiment. Device 700 can also be a host computer connected to a network. Device 700 can be a client computer or a server. As shown in FIG. 7, device 700 can be any suitable type of microprocessor-based device, such as a personal computer, workstation, server, or handheld computing device (portable electronic device) such as a phone or tablet. The device can include, for example, one or more of processor 710, input device 720, output device 730, storage 740, and communication device 760. Input device 720 and output device 730 can generally correspond to those described above, and can either be connectable or integrated with the computer.

Input device 720 can be any suitable device that provides input, such as a touch screen, keyboard or keypad, mouse, or voice-recognition device. Output device 730 can be any suitable device that provides output, such as a touch screen, haptics device, or speaker.

Storage 740 can be any suitable device that provides storage, such as an electrical, magnetic, or optical memory including a RAM, cache, hard drive, or removable storage disk. Communication device 760 can include any suitable device capable of transmitting and receiving signals over a network, such as a network interface chip or device. The components of the computer can be connected in any suitable manner, such as via a physical bus or wirelessly.

Software 750, which can be stored in storage 740 and executed by processor 710, can include, for example, the programming that embodies the functionality of the present disclosure (e.g., as embodied in the devices as described above).

Software 750 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Therefore, according to the above, some examples of the disclosure are directed An RF congestion monitoring system, the system comprising: a memory, one or more processors, one or more programs, wherein the one or more programs are stored in the memory and configured to be executed by the one or more processors, the one or more programs when executed by the one or more processors cause the processor to: receive one or more signals from a RF receiver, determine one or more events from the one or more received signals, for each determined event of the one or more events, determine one or more signal types associated with the determined event, generate one or more event logs, wherein each event log of the one or more event logs corresponds to a determined event of the one or more events and includes information about the one or more determined signal types associated with the determined event, and calculate an occupancy percentage of a transponder, wherein the occupancy percentage is based on the one or more event logs generated by the signal monitor. Additionally or alternatively to one or more examples disclosed above, calculating an occupancy percentage of the transponder includes determining an occupancy time associated with each determined event of the one or more events. Additionally or alternatively to one or more examples disclosed above, calculating an occupancy percentage includes summing the determined occupancy times associated with events that occurred during a pre-determined amount of time. Additionally or alternatively to one or more examples disclosed above, calculating an occupancy percentage includes determining the ratio of the summed occupancy times to the pre-determined amount of time. Additionally or alternatively to one or more examples disclosed above, the RF receiver is configured to 1030 MHz interrogations transmitted by one or more external transmitters. Additionally or alternatively to one or more examples disclosed above, the RF receiver is configured to receive the secondary surveillance radar interrogations on a 1030 MHz frequency band. Additionally or alternatively to one or more examples disclosed above, determining one or more events from the one or more received 1030 MHz interrogations includes determining one or more replies to the one or more interrogation signals. Additionally or alternatively to one or more examples disclosed above, for each determined reply to the one or more interrogation signals determining a signal type associated with the determined reply. Additionally or alternatively to one or more examples disclosed above, the RF receiver is configured to receive False Replies Unsynchronized in Time (FRUIT) signals transmitted by one or more external transmitters. Additionally or alternatively to one or more examples disclosed above, the RF receiver is configured to receive FRUIT signals on a 1090 MHz frequency band.

Other examples of the disclosure are directed to A method for monitoring RF congestion, the method comprising: receiving one or more signals from a RF receiver, determining one or more events from the one or more received signals, for each determined event of the one or more events, determining a signal type associated with the determined event, generating one or more event logs, wherein each event log of the one or more event logs corresponds to a determined event of the one or more events and includes information about the determined signal type associated with the determined event, and calculating an occupancy percentage of a RF receiver, wherein the occupancy percentage is based on the one or more event logs generated by the signal monitor. Additionally or alternatively to one or more examples disclosed above, calculating an occupancy percentage of the transponder includes determining an occupancy time associated with each determined event of the one or more events. Additionally or alternatively to one or more examples disclosed above, calculating an occupancy percentage includes summing the determined occupancy times associated with events that occurred during a pre-determined amount of time. Additionally or alternatively to one or more examples disclosed above, calculating an occupancy percentage includes determining the ratio of the summed occupancy times to the pre-determined amount of time. Additionally or alternatively to one or more examples disclosed above, the RF receiver is configured to 1030 MHz interrogations transmitted by one or more external transmitters. Additionally or alternatively to one or more examples disclosed above, the RF receiver is configured to receive the secondary surveillance radar interrogations on a 1030 MHz frequency band. Additionally or alternatively to one or more examples disclosed above, determining one or more events from the one or more received 1030 MHz interrogations includes determining one or more replies to the one or more interrogation signals. Additionally or alternatively to one or more examples disclosed above, for each determined reply to the one or more interrogation signals determining a signal type associated with the determined reply. Additionally or alternatively to one or more examples disclosed above, the RF receiver is configured to receive False Replies Unsynchronized in Time (FRUIT) signals transmitted by one or more external transmitters. Additionally or alternatively to one or more examples disclosed above, the RF receiver is configured to receive FRUIT signals on a 1090 MHz frequency band.

Other examples of the disclosure are directed to A computer readable storage medium storing one or more programs configured to monitor RF congestion, the one or more programs comprising instructions, which when executed by an electronic device, cause the device to: receive one or more signals from a RF receiver, determine one or more events from the one or more received signals, for each determined event of the one or more events, determine a signal type associated with the determined event, generate one or more event logs, wherein each event log of the one or more event logs corresponds to a determined event of the one or more events and includes information about the determined signal type associated with the determined event, and calculate an occupancy percentage of a RF receiver, wherein the occupancy percentage is based on the one or more event logs generated by the signal monitor. Additionally or alternatively to one or more examples disclosed above, calculating an occupancy percentage of the transponder includes determining an occupancy time associated with each determined event of the one or more events. Additionally or alternatively to one or more examples disclosed above, calculating an occupancy percentage includes summing the determined occupancy times associated with events that occurred during a pre-determined amount of time. Additionally or alternatively to one or more examples disclosed above, calculating an occupancy percentage includes determining the ratio of the summed occupancy times to the pre-determined amount of time. Additionally or alternatively to one or more examples disclosed above, the RF receiver is configured to 1030 MHz interrogations transmitted by one or more external transmitters. Additionally or alternatively to one or more examples disclosed above, the RF receiver is configured to receive the secondary surveillance radar interrogations on a 1030 MHz frequency band. Additionally or alternatively to one or more examples disclosed above, determining one or more events from the one or more received 1030 MHz interrogations includes determining one or more replies to the one or more interrogation signals. Additionally or alternatively to one or more examples disclosed above, for each determined reply to the one or more interrogation signals determining a signal type associated with the determined reply. Additionally or alternatively to one or more examples disclosed above, the RF receiver is configured to receive False Replies Unsynchronized in Time (FRUIT) signals transmitted by one or more external transmitters. Additionally or alternatively to one or more examples disclosed above, the RF receiver is configured to receive FRUIT signals on a 1090 MHz frequency band.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. An RF congestion monitoring system, the system comprising:
   a memory;
   one or more processors;
   one or more programs, wherein the one or more programs are stored in the memory and configured to be executed by the one or more processors, the one or more programs when executed by the one or more processors cause the processor to:
      receive one or more signals from a RF receiver;
      determine one or more events from the one or more received signals;
      for each determined event of the one or more events, determine one or more signal types associated with the determined event;
      generate one or more event logs, wherein each event log of the one or more event logs corresponds to a determined event of the one or more events and includes information about the one or more determined signal types associated with the determined event; and
   calculate an occupancy percentage of a transponder, wherein the occupancy percentage is based on the one or more event logs generated by the signal monitor, wherein the occupancy percentage represents the amount of time that the RF receiver is unavailable to process received signals.

2. The system of claim 1, wherein calculating an occupancy percentage of the transponder includes determining an occupancy time associated with each determined event of the one or more events.

3. The system of claim 2, wherein calculating an occupancy percentage includes summing the determined occupancy times associated with events that occurred during a pre-determined amount of time.

4. The system of claim 3, wherein calculating an occupancy percentage includes determining the ratio of the summed occupancy times to the pre-determined amount of time.

5. The system of claim 1, wherein the RF receiver is configured to 1030 MHz interrogations transmitted by one or more external transmitters.

6. The system of claim 5, wherein the RF receiver is configured to receive the secondary surveillance radar interrogations on a 1030 MHz frequency band.

7. The system of claim 5, wherein determining one or more events from the one or more received 1030 MHz interrogations includes determining one or more replies to the one or more interrogation signals.

8. The system of claim 7, wherein for each determined reply to the one or more interrogation signals determining a signal type associated with the determined reply.

9. The system of claim 1, wherein the RF receiver is configured to receive False Replies Unsynchronized in Time (FRUIT) signals transmitted by one or more external transmitters.

10. The system of claim 9, wherein the RF receiver is configured to receive FRUIT signals on a 1090 MHz frequency band.

11. A method for monitoring RF congestion, the method comprising:
   receiving one or more signals from a RF receiver;
   determining one or more events from the one or more received signals;
   for each determined event of the one or more events, determining a signal type associated with the determined event;
   generating one or more event logs, wherein each event log of the one or more event logs corresponds to a determined event of the one or more events and includes information about the determined signal type associated with the determined event; and
   calculating an occupancy percentage of a RF receiver, wherein the occupancy percentage is based on the one or more event logs generated by the signal monitor, wherein the occupancy percentage represents the amount of time that the RF receiver is unavailable to process received signals.

12. The method of claim 11, wherein calculating an occupancy percentage of the RF receiver includes determining an occupancy time associated with each determined event of the one or more events.

13. The method of claim 12, wherein calculating an occupancy percentage includes summing the determined occupancy times associated with events that occurred during a pre-determined amount of time.

14. The method of claim 13, wherein calculating an occupancy percentage includes determining the ratio of the summed occupancy times to the pre-determined amount of time.

15. The method of claim 11, wherein the RF receiver is configured to receive interrogations transmitted by one or more external transmitters.

16. The method of claim 15, wherein the RF receiver is configured to receive the interrogations on a 1030 MHz frequency band.

17. The method of claim 15, wherein determining one or more events from the one or more received interrogations includes determining one or more replies to the one or more interrogation signals.

18. The method of claim 17, wherein for each determined reply to the one or more interrogation signals determining a signal type associated with the determined reply.

19. The method of claim 11, wherein the RF receiver is configured to receive False Replies Unsynchronized in Time (FRUIT) signals transmitted by one or more external transmitters.

20. The method of claim 19, wherein the RF receiver is configured the FRUIT signals on a 1090 MHz frequency band.

21. A non-transitory computer readable storage medium storing one or more programs configured to monitor RF congestion, the one or more programs comprising instructions, which when executed by an electronic device, cause the device to:
   receive one or more signals from a RF receiver;
   determine one or more events from the one or more received signals;
   for each determined event of the one or more events, determine a signal type associated with the determined event;
   generate one or more event logs, wherein each event log of the one or more event logs corresponds to a determined event of the one or more events and includes information about the determined signal type associated with the determined event; and calculate an occupancy percentage of a RF receiver, wherein the occupancy percentage is based on the one or more event logs generated by the signal monitor, wherein the occupancy percentage represents the amount of time that the RF receiver is unavailable to process received signals.

22. The computer readable storage medium of claim 21, wherein calculating an occupancy percentage of the RF receiver includes determining an occupancy time associated with each determined event of the one or more events.

23. The computer readable storage medium of claim 22, wherein calculating an occupancy percentage includes summing the determined occupancy times associated with events that occurred during a pre-determined amount of time.

24. The computer readable storage medium of claim 23, wherein calculating an occupancy percentage includes determining the ratio of the summed occupancy times to the pre-determined amount of time.

25. The computer readable storage medium of claim 21, wherein the RF receiver is configured to receive secondary surveillance radar interrogations transmitted by one or more external transmitters.

26. The computer readable storage medium of claim 25, wherein the RF receiver is configured to receive the secondary surveillance radar interrogations on a 1030 MHz frequency band.

27. The computer readable storage medium of claim 25, wherein determining one or more events from the one or more received secondary surveillance radar interrogations includes determining one or more replies to the one or more interrogation signals.

28. The computer readable storage medium of claim 27, wherein for each determined reply to the one or more interrogation signals determining a signal type associated with the determined reply.

29. The computer readable storage medium of claim 21, wherein the RF receiver is configured to receive secondary surveillance radar False Replies Unsynchronized in Time (FRUIT) signals transmitted by one or more external transmitters.

30. The computer readable storage medium of claim 29, wherein the RF receiver is configured the secondary surveillance radar FRUIT signals on a 1090 MHz frequency band.

* * * * *